(12) United States Patent
Kollarapu et al.

(10) Patent No.: US 12,348,650 B2
(45) Date of Patent: Jul. 1, 2025

(54) MANAGING ENTITLEMENTS USING OWNERSHIP VOUCHERS

(71) Applicant: Dell Products L.P., Round Rock, TX (US)

(72) Inventors: Rajaravi Chandra Kollarapu, Allen, TX (US); Richard M. Tonry, Georgetown, TX (US); Abeye Teshome, Austin, TX (US); Bassem El-Azzami, Austin, TX (US); Mohit Arora, Frisco, TX (US); Vinodkumar Vasudev Ottar, Mckinney, TX (US); Adolfo Sandor Montero, Pflugerville, TX (US); Luis Antonio Valencia Reyes, Waxahachie, TX (US)

(73) Assignee: Dell Products L.P., Round Rock, TX (US)

( * ) Notice: Subject to any disclaimer, the term of this patent is extended or adjusted under 35 U.S.C. 154(b) by 139 days.

(21) Appl. No.: 18/498,395

(22) Filed: Oct. 31, 2023

(65) Prior Publication Data

US 2025/0141697 A1    May 1, 2025

(51) Int. Cl.
*H04L 9/32* (2006.01)
*H04L 9/40* (2022.01)

(52) U.S. Cl.
CPC .......... *H04L 9/3263* (2013.01); *H04L 9/3247* (2013.01); *H04L 63/0823* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 7,599,907 B2 | 10/2009 | Havewala et al. |
| 8,020,192 B2 | 9/2011 | Wright et al. |
| 8,176,336 B1 | 5/2012 | Mao |
| 8,490,163 B1 | 7/2013 | Harsell et al. |
| 8,850,186 B2 | 9/2014 | Yamauchi |
| 8,925,028 B2 | 12/2014 | Talbert et al. |

(Continued)

FOREIGN PATENT DOCUMENTS

| | | | | |
|---|---|---|---|---|
| WO | 03/090107 A1 | 10/2003 | | |
| WO | WO-2021175273 A1 * | 9/2021 | ......... | G06F 16/9558 |
| WO | WO-2022252857 A1 * | 12/2022 | ............. | G06F 21/44 |

*Primary Examiner* — Benjamin E Lanier
(74) *Attorney, Agent, or Firm* — WOMBLE BOND DICKINSON (US) LLP

(57) ABSTRACT

Methods and systems for managing onboarding of a data processing system are disclosed. To manage onboarding of the data processing system, an entitlement certificate may be obtained from an ownership voucher transferred to the data processing system as part of an onboarding of the data processing system. The entitlement certificate may include a list of entitlements for the data processing system signed using a private key of a public private key pair maintained by a manufacturer of the data processing system. A management controller of the data processing system may utilize the entitlement certificate to request entitlements for the data processing system and to perform action sets to manage the entitlements. The requested entitlements may be verified as trusted by any entity with a public key of the public private key pair maintained by the manufacturer.

20 Claims, 8 Drawing Sheets

(56) References Cited

U.S. PATENT DOCUMENTS

| | | |
|---|---|---|
| 9,191,781 B2 | 11/2015 | Kumar |
| 9,246,678 B2 | 1/2016 | Nayshtut et al. |
| 9,349,009 B2 | 5/2016 | Rivera |
| 9,721,111 B2 | 8/2017 | Cavanaugh |
| 9,721,175 B2 | 8/2017 | Kursun et al. |
| 9,785,491 B2 | 10/2017 | Cilfone et al. |
| 10,021,669 B2 | 7/2018 | George |
| 10,163,105 B1 | 12/2018 | Ziraknejad et al. |
| 10,169,571 B1 | 1/2019 | Attfield et al. |
| 10,395,039 B2 | 8/2019 | Khatri et al. |
| 10,439,814 B1 * | 10/2019 | Grubin ............... H04L 63/0807 |
| 10,630,489 B2 | 4/2020 | Hughes |
| 10,678,555 B2 | 6/2020 | Johansson et al. |
| 10,841,295 B1 | 11/2020 | Pecen et al. |
| 11,563,565 B2 | 1/2023 | Yang et al. |
| 11,704,384 B2 | 7/2023 | Murphy et al. |
| 11,770,456 B1 | 9/2023 | Patel et al. |
| 2007/0006282 A1 | 1/2007 | Durham |
| 2011/0167503 A1 | 7/2011 | Horal |
| 2012/0151512 A1 | 6/2012 | Talbert et al. |
| 2012/0216242 A1 | 8/2012 | Uner |
| 2012/0246704 A1 | 9/2012 | Dorsey et al. |
| 2013/0013727 A1 | 1/2013 | Walker |
| 2013/0318384 A1 | 11/2013 | Yoshihara |
| 2014/0200884 A1 | 7/2014 | McArthur |
| 2015/0100890 A1 | 4/2015 | Kosmiskas et al. |
| 2016/0301713 A1 * | 10/2016 | Krishnamachari ........................ H04L 63/0442 |
| 2017/0277876 A1 | 9/2017 | Alameh et al. |
| 2017/0289197 A1 | 10/2017 | Mandyam et al. |
| 2018/0006829 A1 | 1/2018 | Kravitz et al. |
| 2019/0156019 A1 | 5/2019 | Chen |
| 2020/0007411 A1 | 1/2020 | Arar et al. |
| 2020/0322143 A1 | 10/2020 | Voit |
| 2022/0179958 A1 | 6/2022 | Robison |
| 2022/0223328 A1 | 7/2022 | Talib et al. |
| 2023/0222468 A1 | 7/2023 | Wilson et al. |
| 2023/0222469 A1 | 7/2023 | Wilson et al. |
| 2023/0229512 A1 | 7/2023 | Sawal et al. |
| 2023/0229516 A1 | 7/2023 | Sawal et al. |
| 2023/0229777 A1 | 7/2023 | Pierre |
| 2023/0308266 A1 * | 9/2023 | Furch ................... H04L 9/3268 |
| 2023/0379152 A1 | 11/2023 | Ramadasse |
| 2023/0403269 A1 | 12/2023 | Valkaitis |
| 2024/0312515 A1 | 9/2024 | Liao |

* cited by examiner

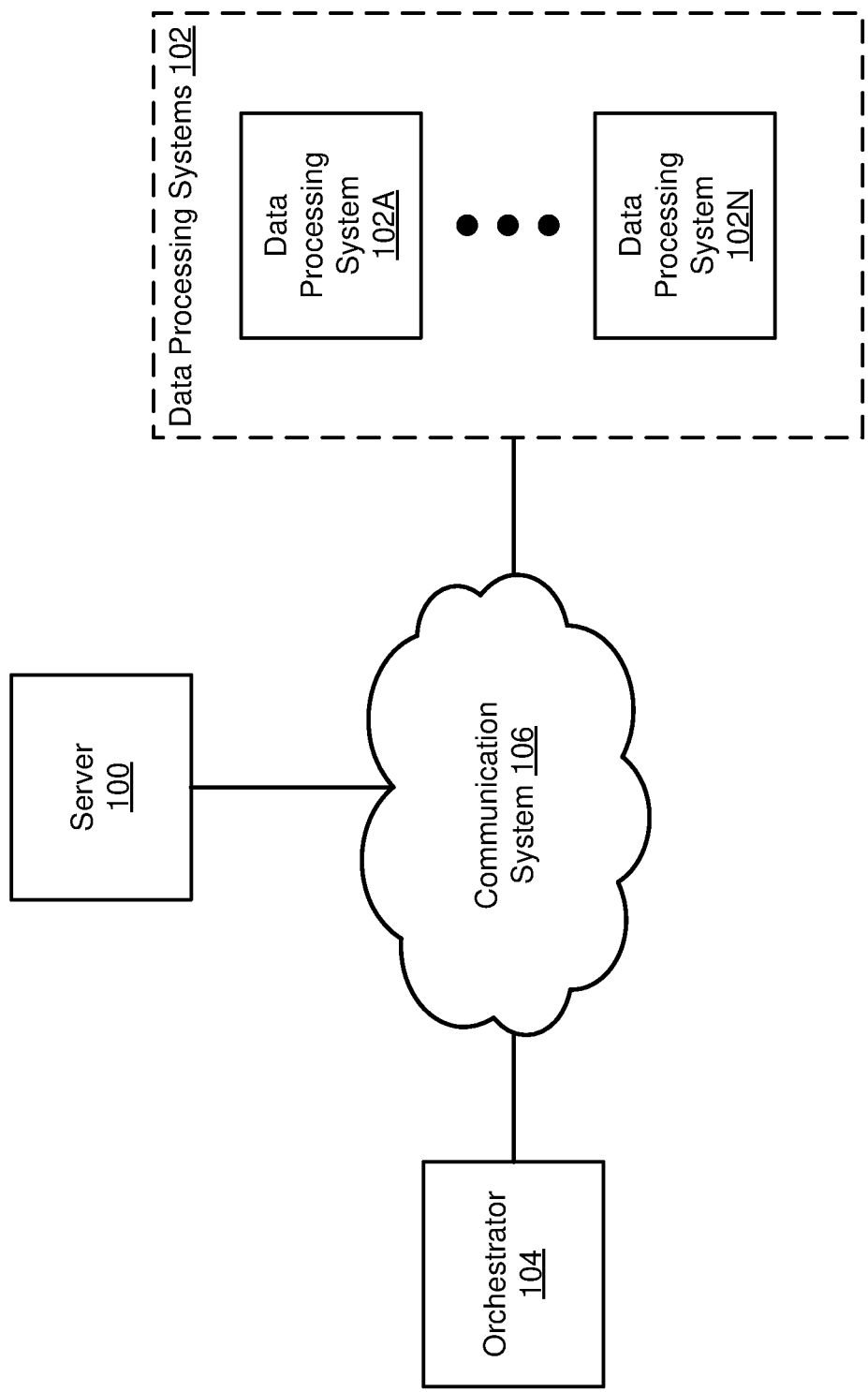

MANAGING ENTITLEMENTS USING OWNERSHIP VOUCHERS

FIELD

Embodiments disclosed herein relate generally to managing onboarding of data processing systems. More particularly, embodiments disclosed herein relate to systems and methods to manage entitlements for a data processing system of the data processing systems using at least an ownership voucher.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1A shows a block diagram illustrating a system in accordance with an embodiment.

DETAILED DESCRIPTION

Figure 1B:
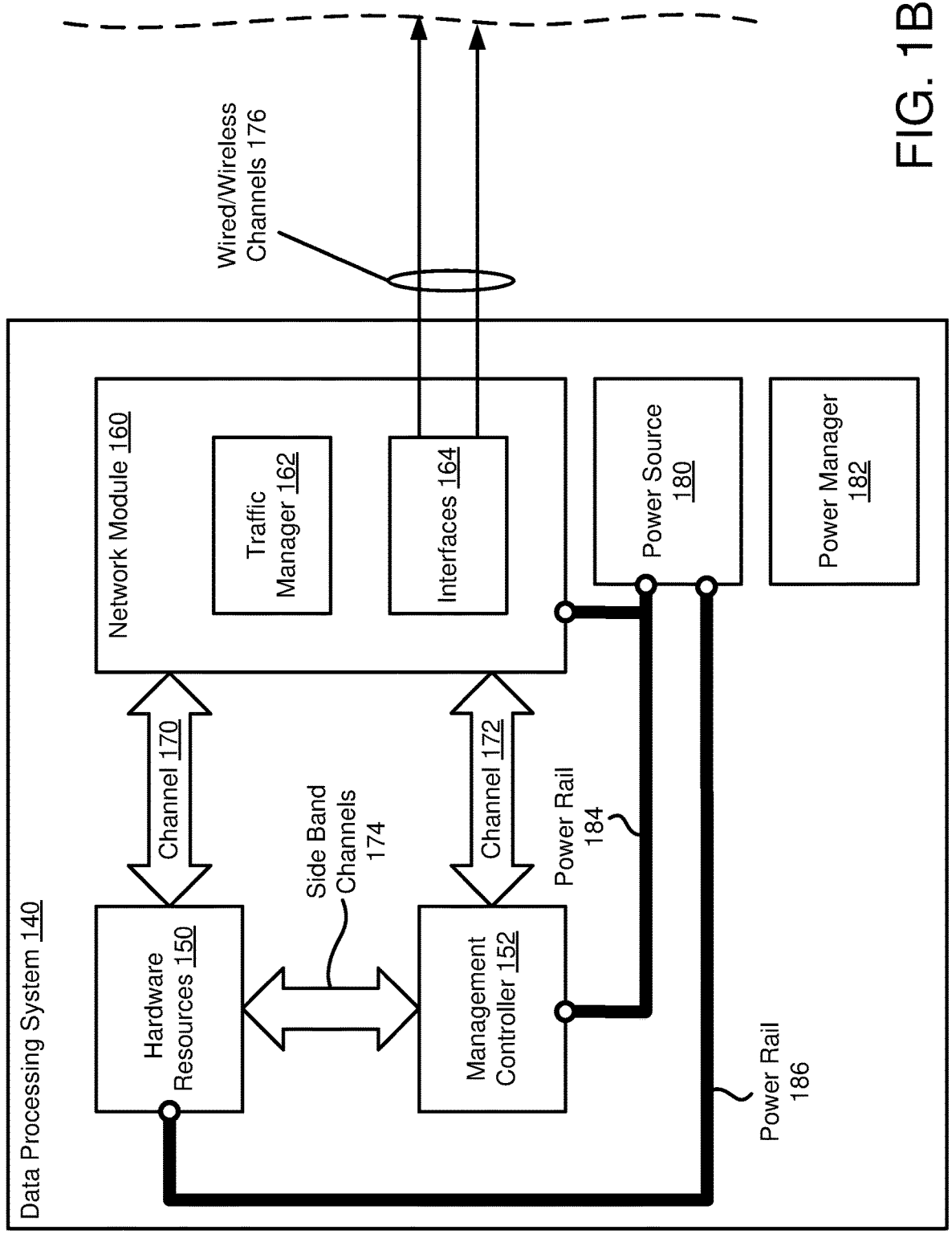
FIG. 1B shows a block diagram illustrating a data processing system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing onboarding of data processing systems. The data processing systems may provide computer-implemented services to any type and number of other devices and/or users of the data processing systems. The computer-implemented services may include any quantity and type of such services.

An ownership voucher may be provided to a data processing system during an onboarding of the data processing system. The ownership voucher may include a cryptographically signed delegation of authority over the data processing system to an entity (e.g., a new owner of the data processing system). The ownership voucher may also include one or more certificates (e.g., a certificate chain) usable to maintain a record of transactions involving the data processing system.

Following the onboarding of the data processing system, one or more entitlements for the data processing system (e.g., subscriptions purchased by the new user of the data processing system) may be activated. Activation of the one or more entitlements may include an interaction between hardware components of the data processing system and a server. For example, the new user of the data processing system may request access to the one or more entitlements and the server may determine, via a lookup process in a database of entitlements for users, whether the new user of the data processing system has access to the requested entitlements.

Doing so may require multiple entitles (e.g., the new user, the server, the manufacturer) to maintain copies of the entitlements to which the new user has access (e.g., via maintaining an active subscription). Maintaining copies of entitlement records in storage and performing a lookup process as part of the activation of the one or more entitlements may consume an undesirable quantity of computing resources and/or may cause unwanted delays in provision of computer-implemented services using the data processing system.

To reduce delays and resource consumption during entitlement management for data processing systems, an entitlement certificate may be included in the ownership voucher. The entitlement certificate may include a payload indicating a list of entitlements for the data processing system and a signature generated using a private key of a public private key pair maintained by a manufacturer of the data processing system. As the entitlement certificate is signed by the manufacturer, it may be determined whether any changes were made to the list of the entitlements following signing of the list of the entitlements by the manufacturer.

To manage the entitlement certificate included in the ownership voucher, the data processing system may include a management controller. The management controller may operate independently from hardware resources of the data processing system (e.g., via a separate power source and a separate network endpoint from the hardware resources) and may be distinct from the hardware resources. Therefore, the management controller may provide management functionalities (e.g., entitlement management) for the data processing system regardless of a status (e.g., powered on or powered off) of one or more in band components (e.g., the hardware resources).

To activate entitlements for the data processing system, the management controller may provide at least a portion of the entitlement certificate to a server and the server may verify the signature in the entitlement certificate using a public key of the public private key pair maintained by the manufacturer. By doing so, the list of the entitlements in the entitlement certificate may be trusted by the server and the entitlements for the data processing system may be activated without performing any additional steps to identify whether the user is authorized to access the requested entitlements.

In an embodiment, a method of managing onboarding of a data processing system is provided. The method may include: identifying, by a management controller of the data processing system, an occurrence of an onboarding event for the data processing system; obtaining, by the management controller, an entitlement certificate from an ownership voucher transferred to the data processing system as part of an onboarding of the data processing system to a domain, the entitlement certificate being signed using a private key of a public private key pair kept secret by a manufacturer of the data processing system; and performing, by the management controller and via an out of band communication channel, an action set to manage entitlements for the data processing system using the entitlement certificate.

The method may also include: identifying, by the management controller, that at least a portion of the entitlement certificate has expired; obtaining, by the management controller and via the out of band communication channel, an updated entitlement certificate; and performing, by the management controller, a second action set to manage updated entitlements using the updated entitlement certificate.

The ownership voucher may include: the entitlement certificate; and at least one delegation of authority over the data processing system.

The entitlement certificate may include: a payload indicating a list of entitlements for the data processing system; and a signature generated using the private key of the public private key pair maintained by the manufacturer.

The at least one delegation of authority over the data processing system may include: an ownership certificate, the ownership certificate comprising: a payload comprising a public key for the owner of the data processing system; and a signature generated using the private key of the public private key pair maintained by the manufacturer.

A public key of the public private key pair may be distributed to one or more entities of the domain to permit the one or more entities to verify integrity and trust in contents of the ownership voucher.

Performing the action set to manage the entitlements for the data processing system comprises: generating, by the management controller, a message comprising the entitlement certificate; providing the message to a server associated with the domain; obtaining, in response to the providing, an indication of whether the server was able to verify the entitlement certificate using at least a public key of the public private key pair; in an instance of the obtaining in which the server was able to verify the entitlement certificate: cooperatively performing an action set to enable the entitlements for the data processing system.

Performing the action set to manage the entitlements for the data processing system comprises: identifying an occurrence of an end of life event for the data processing system; providing a message to an end of life management service, the message comprising the entitlement certificate; obtaining, in response to the providing, an indication of whether the end of life management service was able to verify the entitlement certificate using at least a public key of the public private key pair; and in an instance of the obtaining in which the end of life management service was able to verify the entitlement certificate: cooperatively performing an end of life action set for the data processing system with the end of life management service.

The data processing system may include a network module adapted to separately advertise network endpoints for the management controller and hardware resources of the data processing system, the network endpoints being usable by entities throughout the domain to address communications to the hardware resources using an in band communication channel and the management controller using the out of band communication channel.

The management controller and the network module may be on separate power domains from the hardware resources so that the management controller and the network module are operable while the hardware resources are inoperable.

The out of band communication channel may run through the network module, and an in band communication channel that services the hardware resources may also run through the network module.

The network module may host a transmission control protocol/internet protocol (TCP/IP) stack to facilitate network communications via the out of band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1C:
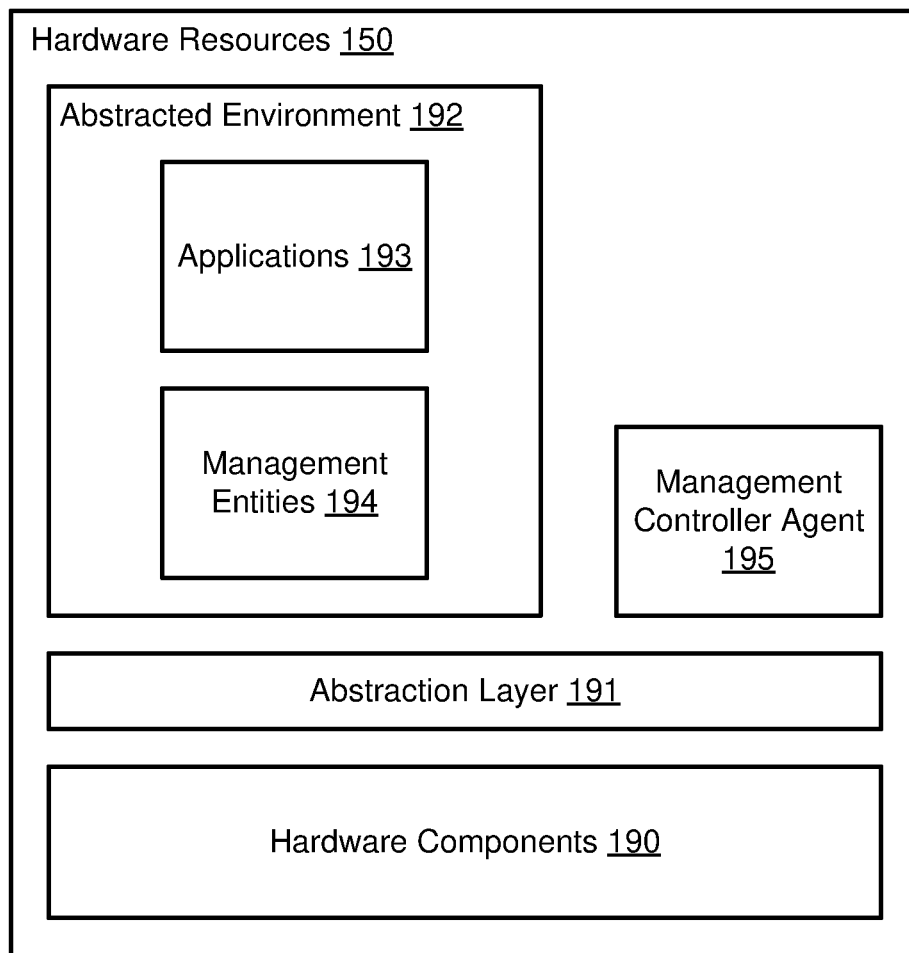
FIG. 1C shows a block diagram illustrating hardware resources of a data processing system in accordance with an embodiment.

Turning to FIG. 1A, a block diagram illustrating a system in accordance with an embodiment is shown. The system shown in FIG. 1A may provide for management of onboarding of data processing systems that may provide, at least in part, computer-implemented services. The system may include any number of data processing systems 102 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time. Refer to FIGS. 1B-1C for additional details regarding data processing systems 102.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, server 100, data processing systems 102, orchestrator 104, and/or any other type of devices (not shown in FIG. 1A). Other types of computer-implemented services may be provided by the system shown in FIG. 1A without departing from embodiments disclosed herein.

The computer-implemented services may be provided, at least in part, by hardware resources of data processing systems 102 and the computer-implemented services may be desired by a user of data processing systems 102. To provide the desired computer-implemented services, the user (e.g., an owner of the data processing system) may desire to access one or more entitlements for a data processing system (e.g., 102A). For example, a user of data processing system 102A may purchase one or more subscriptions (e.g., a warranty, cloud storage), which may modify a list of entitlements for data processing system 102A. The list of the entitlements may change for other reasons (e.g., expiration of one or more subscriptions, end of life of the data processing system) without departing from embodiments disclosed herein.

To facilitate access to the entitlements of the list of the entitlements regardless of a state (e.g., powered, unpowered, compromised) of data processing system 102A, data processing system 102A may include a management controller. The management controller may operate independently from the hardware resources of data processing system 102A and may be distinct from the hardware resources. Therefore, the management controller may provide management functionalities for data processing system 102A regardless of a status of one or more in band components (e.g., the hardware resources). Refer to FIG. 1B for additional details regarding the management controller.

To manage the entitlements, an entity (e.g., a user, the management controller) may submit a request for the entitlements to a server (e.g., 100) and server 100 may determine, via comparison to one or more databases, whether the entity is authorized to access the requested entitlements.

Doing so may result in delays in providing access to entitlements and, therefore, delays in provision of computer-implemented services by data processing system 102A. In addition, maintaining copies of active entitlements by the user and/or server 100 may consume computing resources (e.g., storage) that may otherwise be allocated to other purposes. Therefore, doing so may cause undesirable delays in provision of the computer-implemented services and/or may consume an undesirable amount of resources (e.g., computing resources, time resources, cognitive resources).

In general, embodiments disclosed herein relate to systems, devices, and methods for managing entitlements for a data processing system during onboarding of the data processing system. To do so, an entitlement certificate (e.g., a cryptographically signed list of entitlements for the data processing system) may be included in an ownership voucher provided to the data processing system during onboarding of the data processing system. The management controller may obtain the entitlement certificate and may utilize the entitlement certificate to request entitlements for the data processing system.

The entitlement certificate may include: (i) a payload indicating a list of entitlements to which the data processing system is authorized and (ii) a signature generated using a private key of a public private key pair maintained by a manufacturer of the data processing system. Therefore, upon requesting access to the entitlements from a server (e.g., server 100), the management controller may provide at least a portion of the entitlement certificate to server 100. As the entitlement certificate includes the signature, server 100 may verify the signature using a public key of the public private key pair maintained by the manufacturer. If the signature is verified and the requested entitlements match the payload from the signature, server 100 may trust that data processing system 102A is authorized to access the requested entitlements.

By doing so, the user and server 100 may not be responsible for maintaining copies of authorized entitlements and all information regarding authorized entitlements may be provided, via the ownership voucher, to data processing system 102A during onboarding. Consequently, time and computing resources required to access entitlements for data processing system 102A may be reduced.

Server 100 may be implemented using a physical device that stores and manages device registrations, entitlements, and/or other information related to data processing systems 102. For example, server 100 may be a manufacturer of data processing systems 102, a warranty provider for data processing systems 102, an end of life management service for data processing systems 102, and/or other entities.

Orchestrator 104 may provide ownership vouchers (e.g., including information usable to validate a root of trust and delegate authority over a data processing system to another entity) to entities with permissions to onboard and/or manage data processing systems 102. Orchestrator 104 may also manage ownership vouchers for data processing systems 102 throughout transactions involving intermediate entities (e.g., re-sellers, etc.). For example, orchestrator 104 may generate an ownership voucher for data processing system 102A using transaction data indicating a transfer of authority for data processing system 102A and/or may update the ownership voucher over time if authority over data processing system 102A is transferred to another entity.

Any of the components illustrated in FIG. 1A may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of any of data processing systems 102 server 100, and orchestrator 104).

Communication system 106 may include out of band communication channels, in band communication channels, and/or other types of communication channels.

Refer to FIG. 1B for additional details regarding the management controller, network module, out of band communication channel, and/or hardware resources of data processing systems 102.

Turning to FIG. 1B, a diagram illustrating data processing system 140 in accordance with an embodiment is shown. Data processing system 140 may be similar to any of data processing systems 102 shown in FIG. 1A.

To provide computer-implemented services, data processing system 140 may include any quantity of hardware resources 150. Hardware resources 150 may be in band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

In addition, different configurations of hardware resources 150 and/or software resources may be implemented by data processing system 140 based on the type of computer-implemented services that are to be provided. Modifications to configurations of hardware resources 150 and/or the software resources may lead to downtime for data processing system 140 and may consume network bandwidth of channel 170.

To reduce the downtime of data processing system 140 and to reduce the likelihood of the applications and/or other in band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in band components, such as hardware resources 150, of a host data processing system 140). Management controller 152 may provide various management functionalities for data processing system 140. For example, management controller 152 may monitor various ongoing processes performed by the in band component, may manage power distribution, thermal management, and/or other functions of data processing system 140.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Management controller 152 may be operably connected to communication components of data processing system 140 via separate channels (e.g., 172) from the in band components, and may implement or otherwise utilize a distinct and independent network stack (e.g., TCP/IP). Consequently, management controller 152 may communicate with other devices independently of any of the in band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in band components and out of band components (e.g., management controller 152) of data processing system. Specifically, an out of band communication channel (e.g., 172) that services management controller 152 and an in band communication channel (e.g., 170) that services hardware resources 150 may run through network module 160. Network module 160 may host a TCP/IP stack to facilitate network communications via the out of band communication channel. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in band components and out of band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in band components.

Likewise, outbound traffic from the out of band component may never flow through the in band components.

Specifically, network module 160 may separately advertise network endpoints for management controller 152 and hardware resources 150. The network endpoints may be usable by entities throughout a domain to which data processing system 140 is onboarded to address communications to hardware resources 150 using the in band communication channel (e.g., 170) and management controller 152 using the out of band communication channel (e.g., 172).

To provide its functionality, management controller 152 may: (i) identify an occurrence of an onboarding event for data processing system 140, (ii) obtain an entitlement certificate from an ownership voucher transferred to data processing system 140 as part of an onboarding of data processing system 140 to a domain, (iii) perform, via an out of band communication channel (e.g., 172) an action set to manage entitlements for data processing system 140 using the entitlement certificate, and/or (iv) perform other actions.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, a radio access network (RAN) card, a wide area network (WAN) card, and/or other types of communication components. These components may support any number of wired/wireless channels 176.

Thus, from the perspective of an external device, the in band components and out of band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 140 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2A:
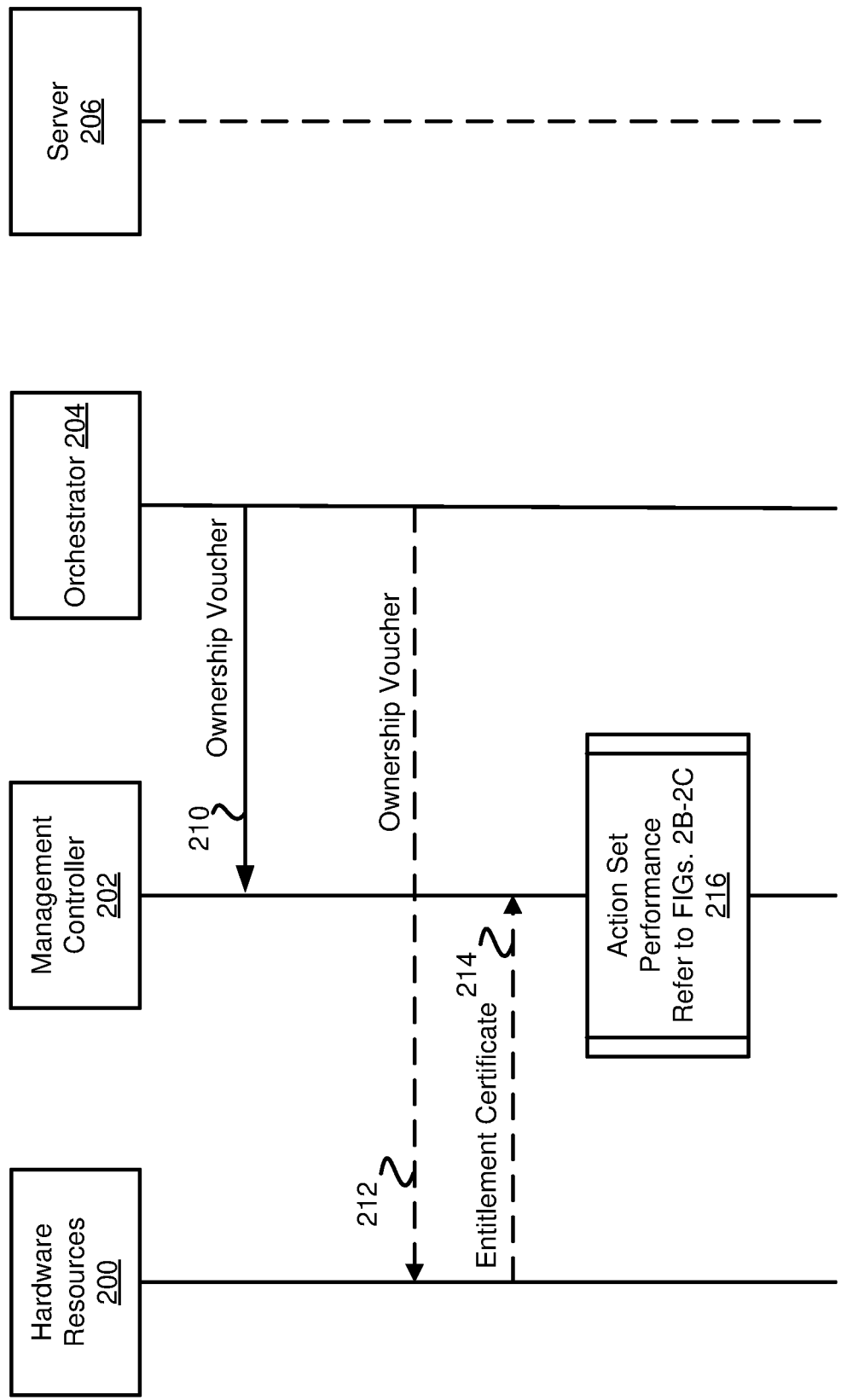
FIGS. 2A-2C show interaction diagrams in accordance with an embodiment.
Figure 2B:
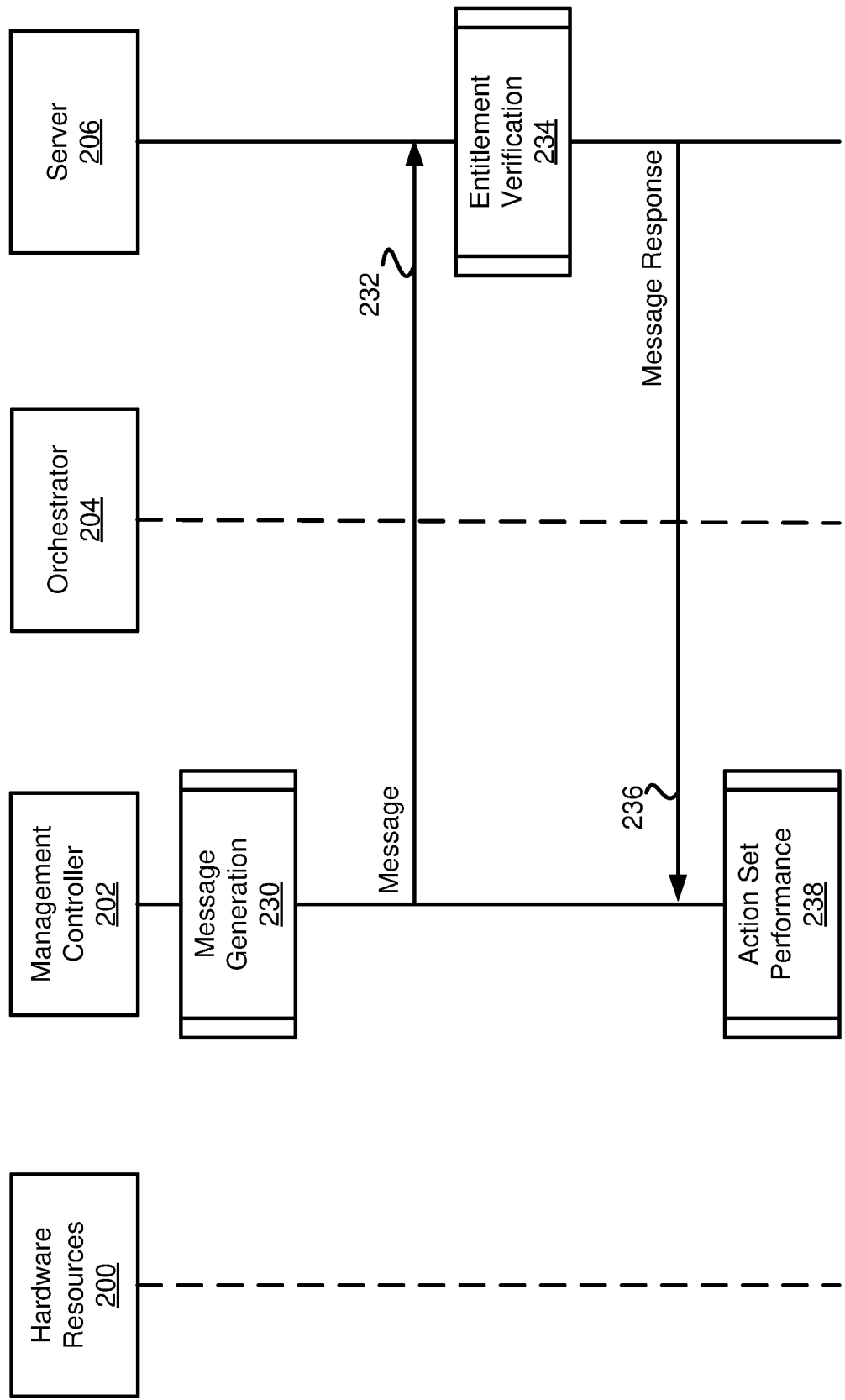
Figure 2C:
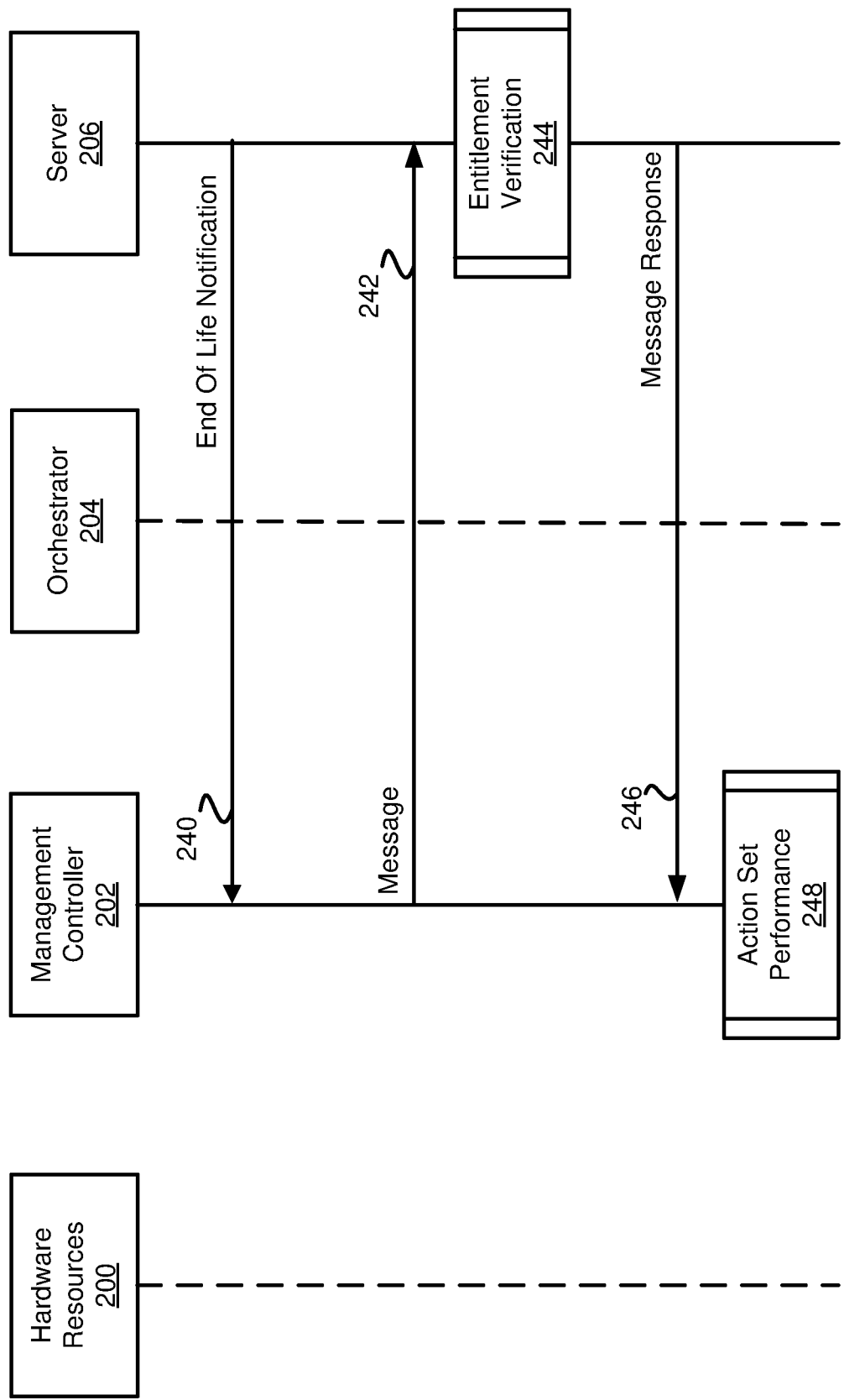
Figure 3:
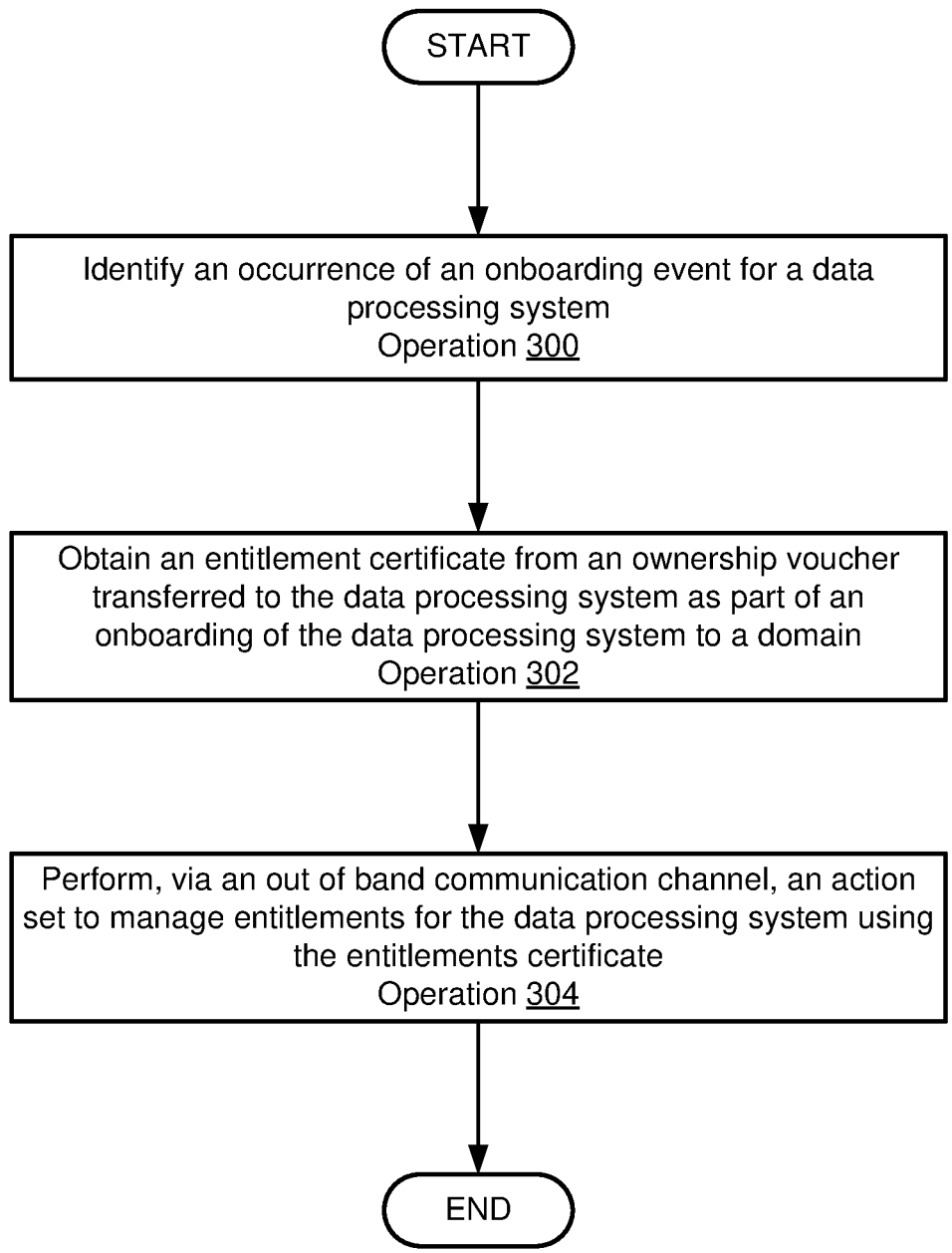
FIG. 3 shows a flow diagram illustrating a method of managing onboarding of a data processing system in accordance with an embodiment.

When providing its functionality, components of data processing system 140 may perform all, or a portion, of the methods and operations illustrated in FIGS. 2A-3.

While illustrated in FIG. 1B with a limited number of specific components, a system may include additional, fewer, and/or different components without departing from embodiments disclosed herein.

Turning to FIG. 1C, to provide computer-implemented services, hardware resources 150 may host applications 193 and management entities 194. Management entities 194 may include, for example, drivers, operating systems, and/or other entities that facilitate operation of applications 193 by facilitating use of hardware resources 150. Hardware resources 150 may include processors, memory modules, storage devices, and/or other types of hardware components usable to provide computer-implemented services.

Applications 193 may provide any quantity and type of computer-implemented services using hardware components 190. When operating, applications 193 may use abstracted access to the functionality of hardware components 190 provided by management entities 194. For example, the applications may make calls to an operating system which in turn makes calls to drivers which in turn communicate with the hardware components to invoke their various functionalities.

In an embodiment, hardware resources 150 also hosts abstraction layer 191. Abstraction layer 191 may include software such as hypervisors, dockers, and/or other entities that provide abstracted access to hardware components to various abstracted environments (e.g., 192). The abstracted environments may include virtual machines, containers, etc. Through abstraction layer 191 and abstracted environments, hardware resources 150 may host various instances of management entities and applications that may utilize the functionalities of hardware components 190.

To facilitate cooperation between management controller 152 and hardware resources 150, hardware resources 150 may host management controller agent 195. Management controller agent 195 may be independent from the abstracted environments, and may facilitate communication with and performance of instructions by management controller 152.

For example, management controller agent 195 may include functionality to (i) monitor various abstracted environments, and components therein, (ii) identify operating states (e.g., nominal, stalled, in error of various levels of severity), (iii) obtain information regarding the states of the environments such as, for example, content of virtualized memory, processors, logs of operation of various software and/or abstracted hardware components, (iv) write data to and/or otherwise communicate with the entities in the virtualized environments, (v) make modifications to the virtualized environment and/or entities hosted thereby through invocation of various functions of abstraction layer 191 and/or other entities, (vi) adjust distribution of use of hardware components 190 by the abstracted environment, and/or (vii) perform other types of management actions through which information regarding the operation of entities hosted by abstracted environment 192 may be collected.

As discussed above, the components of FIGS. 1A-1C may perform various methods to manage onboarding of a data processing system. FIGS. 2A-3 may illustrate examples of methods that may be performed by the components of FIGS.

1A-1C. For example, a management controller similar to management controller 152 may perform all or a portion of the methods. In the diagrams discussed below and shown in FIGS. 2A-3, any of the operations may be repeated, performed in different orders, and/or performed in parallel with or in a partially overlapping in time manner with other operations.

To further clarify embodiments disclosed herein, interactions diagrams in accordance with an embodiment are shown in FIGS. 2A-2C. These interactions diagrams may illustrate how data may be obtained and used within the system of FIGS. 1A-1C.

In the interaction diagrams, processes performed by and interactions between components of a system in accordance with an embodiment are shown. In the diagrams, components of the system are illustrated using a first set of shapes (e.g., hardware resources 200, management controller 202, etc.), located towards the top of each figure. Lines descend from these shapes. Processes performed by the components of the system are illustrated using a second set of shapes (e.g., action set performance process 216, etc.) superimposed over these lines. Interactions (e.g., communication, data transmissions, etc.) between the components of the system are illustrated using a third set of shapes (e.g., 210, 212, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 212 may occur prior to the interaction labeled as 214. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during onboarding of a data processing system.

In FIG. 2A, the line descending from one of the first set of shapes (e.g., server 206) is drawn in dashing to indicate, for example, that the corresponding components may not be (i) operable, (ii) powered on, (iii) present in the system, and/or (iv) not participating in operation of the system for other reasons. Specifically, server 206 may not participate in the onboarding of the data processing system shown in FIG. 2A.

Onboarding the data processing system (e.g., data processing system 140 described in FIG. 1B) may include obtaining an ownership voucher for data processing system 140 and initiating activation of one or more entitlements for data processing system 140.

Data processing system 140 may include at least hardware resources 200 and management controller 202. Each of these components is described in detail in FIGS. 1A-1C. Management controller 202 may perform management functions for data processing system 140 via interactions with a server (e.g., server 206). For example, management controller 202 may be responsible for managing the one or more subscriptions purchased by the new user (and/or other entitlements for data processing system 140). To do so, management controller 202 may obtain an entitlement certificate from the ownership voucher. This process is described in detail below.

In FIG. 2A, two potential methods of obtaining the entitlement certificate by management controller 202 are shown. A first method may include interaction 210 and is depicted using a solid line as one of the third set of the shapes. A second method may include interactions 212 and 214 and is depicted using dashed lines as the third set of the shapes. Process 216 (e.g., one of the second set of the shapes) may be performed as part of both methods.

In the first method of obtaining the entitlement certificate, at interaction 210, management controller 202 may obtain an ownership voucher from orchestrator 204 in the form of a message via an out of band communication channel. The ownership voucher may include: (i) the entitlement certificate, (ii) at least one delegation of authority over data processing system 140, and/or (iii) other information usable to onboard data processing system 140.

The entitlement certificate may include: (i) a payload indicating a list of entitlements for data processing system 140, (ii) a signature generated using a private key of a public private key pair maintained by a manufacturer of data processing system 140, and/or (iii) other information.

The payload may include a list of entitlements to which the user of data processing system 140 is authorized to access. Specifically, the user may have purchased one or more subscriptions to services (e.g., a warranty service, a cloud storage service, an end of life service) via an interaction with the manufacturer (e.g., server 206 and/or another entity). The payload may include a list of these subscriptions based on the interaction.

The signature generated using the private key (e.g., of the public private key pair maintained by the manufacturer of data processing system 140) may include cryptographic information generated using the payload and the private key. The cryptographic information may include a hash of the information and/or any other type of cryptographic information. The signature may be verified as genuine (e.g., generated by the manufacturer) by any entity with access to a public key of the public private key pair maintained by the manufacturer.

The at least one delegation of authority over data processing system 140 may include at least one ownership certificate. The at least one ownership certificate may include: (i) a payload including a public key for the owner of data processing system 140, (ii) a signature generated using the private key of the public private key pair maintained by the manufacturer, and/or (iii) other information. The at least one delegation of authority also may include a certificate chain. The certificate chain may establish cryptographically verifiable delegations of authority from a root of trust (e.g., the manufacturer) to the current owner via any number of transfers of authority.

The payload may include a statement of delegation indicating which privileges are being delegated to the user (e.g., the owner). For example, the payload may indicate that all authority to manage, onboard, and/or otherwise modify data processing system 140 is being delegated to the owner. The owner may be, for example, a client, an intermediate entity that is selling data processing system 140 to a client, etc. The public key for the owner may be any public key (e.g., a string of letters, numbers, and/or other characters) associated with the owner that is publicly available and usable for to encrypt data intended to be decrypted by only the intermediate entity. The payload may include any number of such certificates that establish a cryptographically verifiable certificate chain between the root of trust and the public key associated with the owner.

The signature generated using the private key (e.g., the private key maintained by the manufacturer of data processing system 140) may include cryptographic information generated using the payload and the private key. The cryptographic information may include a hash of the information and/or any other type of cryptographic information.

Following interaction 210, management controller 202 may extract the entitlement certificate from the ownership voucher (not shown) and the first method may proceed to action set performance process 216.

Management controller 202 may perform action set performance process 216. During action set performance process 216, management controller 202 may manage entitlements for data processing system 140 using the entitlement certificate and via at least an interaction with server 206. Refer to FIGS. 2B-2C for examples of expansions of action set performance process 216.

In the second method of obtaining the entitlement certificate, at interaction 212, hardware resources 200 may obtain the ownership voucher from orchestrator 204 in the form of a message via an in band communication channel. Hardware resources 200 may store and/or manage any portion of the ownership voucher.

At interaction 214, management controller 202 may obtain the entitlement certificate from hardware resources 200 in the form of a message via a side band communication channel. Hardware resources 200 may have previously extracted the entitlement certificate from the ownership voucher (not shown) and may provide the entitlement certificate to management controller 202 so that management controller 202 may perform action set performance process 216.

The first method (e.g., including interaction 210) and the second method (e.g., including interactions 212 and 214) may, therefore, represent two methods by which management controller 202 may obtain the entitlement certificate.

If, for example, at least a portion of the entitlement certificate has expired (e.g., via a time duration elapsing and/or the owner modifying subscriptions for data processing system 140), management controller may perform similar interactions (e.g., 210 or 212 and 214) to obtain an updated entitlement certificate (not shown).

To do so, management controller 202 may identify (e.g., via an interaction with hardware resources 200, orchestrator 204, and/or server 206) that that at least the portion of the entitlement certificate has expired. Management controller 202 may then obtain, via the out of band communication channel, an updated entitlement certificate from orchestrator 204. Following obtaining the updated entitlement certificate, management controller 202 may perform a second action set to manage updated entitlements using the updated entitlement certificate.

Turning to FIG. 2B, a second interaction diagram in accordance with an embodiment is shown. The second interaction diagram may illustrate example processes and interactions that may occur during action set performance process 216 shown in FIG. 2A.

The lines descending from some of the first set of shapes (e.g., hardware resources 200, orchestrator 204) is drawn in dashing to indicate, for example, that the corresponding components may not be (i) operable, (ii) powered on, (iii) present in the system, and/or (iv) not participating in operation of the system for other reasons. Specifically, hardware resources 200 and orchestrator 204 may not participate in action set performance process 216.

To perform the management functions regardless of a status (e.g., powered, unpowered, compromised) of hardware resources 200, management controller 202 may utilize an out of band communication channel to interact with server 206. The out of band communication channel may be different from the side band communication channel and in band communication channel utilized in FIG. 2A. Refer to FIG. 1B for additional information regarding communication channels and network endpoints.

Following the onboarding event described in FIG. 2A, management controller 202 may be responsible for requesting activation of a list of entitlements for data processing system 140. The list of entitlements may include, for example, functionalities based on any subscriptions purchased by a user of data processing system 140 (e.g., warranty services, cloud storage).

To initiate activation of the entitlements, management controller 202 may perform message generation process 230. During message generation process 230, management controller 202 may generate a message using at least the entitlement certificate obtained by management controller 202 in FIG. 2A. Refer to FIG. 2A for details regarding the entitlement certificate.

Management controller 202 may include the entitlement certificate and/or any portion of information from the certificate in the message. The message may include at least: (i) a list of requested entitlements for data processing system 140, (ii) entitlement certificate, and/or (iii) other information.

At interaction 232, the message may be provided to server 206 by management controller 202. The message may be provided to server 206 using the out of band communication channel and via a network endpoint associated with management controller 202.

In response to receiving the message, server 206 may perform entitlement verification process 234. During entitlement verification process 234, server 206 may utilize a public key of the public private key pair maintained by the manufacturer to verify that the list of the entitlements was signed using the private key of the public private key pair maintained by the manufacturer. The public key of the public private key pair maintained by the manufacturer may be distributed (e.g., during onboarding and/or at another time) to any number of entities throughout a domain to which data processing system 140 is being onboarded. By doing so, the any number of entities throughout the domain may utilize the public key to verify integrity and trust in contents of the ownership voucher. Server 206 may be one of the one or more entities throughout the domain and server 206 may utilize the public key to verify the contents of the entitlement certificate.

If the signature is verified, server 206 may extract a payload from the message, the payload indicating entitlements authorized for data processing system 140 via the entitlement certificate. If the requested entitlements indicated in the message match the authorized entitlements, server 206 may honor the request for the entitlements included in the message.

If the request for the entitlements is to be honored, at interaction 236, a message response is provided to management controller 202 by server 206. The message response may indicate whether the request for the entitlements is honored and may be provided in the form of a message via the out of band communication channel.

Following receipt of the message response by management controller 202, the entitlements included in the entitlement certificate may be available to data processing system 140 and/or a user of data processing system 140.

For example, an entitlement of the entitlements may be a warranty service. If an expected functionality of data processing system 140 fails, management controller 202 may perform action set performance process 238 to invoke the warranty service.

During action set performance process 238, management controller 202 may cooperatively perform an action set to enable the entitlements for data processing system 140. Continuing with the above example related to a warranty service, action set performance process 238 may include: (i) providing a notification to server 206 that the warranty service is invoked, (ii) receiving, in response to the provided notification, a request for additional information regarding the failed functionality (e.g., any amount of diagnostic data), (iii) providing the additional information to server 206, (iv) receiving one or more suggested actions to troubleshoot the failed functionality, and/or (v) other actions.

While described above with respect to a warranty service, it may be appreciated that action set performance process 238 may include cooperatively performing other processes to manage other entitlements for data processing system 140 without departing from embodiments disclosed herein.

Turning to FIG. 2C, a third interaction diagram in accordance with an embodiment is shown. The third interaction diagram may illustrate second example processes and interactions that may occur during action set performance process 216 shown in FIG. 2A.

The lines descending from some of the first set of shapes (e.g., hardware resources 200, orchestrator 204) are drawn in dashing to indicate, for example, that the corresponding components may not be (i) operable, (ii) powered on, (iii) present in the system, and/or (iv) not participating in operation of the system for other reasons. Specifically, hardware resources 200 and orchestrator 204 may not participate in action set performance process 216.

To perform the management functions regardless of a status (e.g., powered, unpowered, compromised) of hardware resources 200, management controller 202 may utilize an out of band communication channel and a second network endpoint to interact with server 206. The out of band communication channel may be different from the side band communication channel and in band communication channel utilized in FIG. 2A. Refer to FIG. 1B for additional information regarding communication channels and network endpoints.

Following the onboarding event described in FIG. 2A, management controller 202 may manage entitlements for data processing system 140. An example of an entitlement may be an end of life service for hardware and/or software components of data processing system 140.

At interaction 240, management controller 202 may obtain an end of life notification from server 206 in the form of a message via an out of band communication channel. In FIG. 2C, server 206 may be an end of life management service and the end of life notification may indicate, for example, that a manufacturer of data processing system 140 will no longer offer support for data processing system 140 (and/or a particular hardware and/or software component of data processing system 140). Due to the lack of support, at least a portion of data processing system 140 may no longer be used by an owner of data processing system 140.

At interaction 242 and in response to the end of life notification, management controller 202 may provide a message to server 206. Management controller 202 may include an entitlement certificate (described in detail in FIG. 2B) and/or any portion of information from the entitlement certificate in the message. The message may include at least: (i) a list of requested entitlements for data processing system 140, (ii) the entitlement certificate, and/or (iii) other information. The list of the requested entitlements may include an end of life service to be provided by the end of life management service (e.g., server 206). The message may be provided to server 206 via a message using the out of band communication channel and via a network endpoint associated with management controller 202.

In response to receiving the message, server 206 may perform entitlement verification process 244. During entitlement verification process 244, server 206 may utilize a public key of the public private key pair maintained by the manufacturer to verify that the list of the entitlements was signed using the private key of the public private key pair maintained by the manufacturer. The public key of the public private key pair maintained by the manufacturer may be distributed (e.g., during onboarding and/or at another time) to any number of entities throughout a domain to which data processing system 140 is being onboarded. By doing so, the any number of entities throughout the domain may utilize the public key to verify integrity and trust in contents of the ownership voucher. Server 206 may be one of the one or more entities throughout the domain and server 206 may utilize the public key to verify the contents entitlement certificate.

If the signature is verified, server 206 may extract a payload from the message, the payload indicating entitlements authorized for data processing system 140 via the entitlement certificate. If the requested entitlements indicated in the message match the authorized entitlements, server 206 may honor the request for the entitlements included in the message.

If the request for the entitlements is to be honored, at interaction 246, a message response is provided to management controller 202 by server 206. The message response may indicate whether the request for the entitlements is honored and may be provided in the form of a message via the out of band communication channel.

Following receipt of the message response by management controller 202, the entitlements included in the entitlement certificate (e.g., the end of life service) may be available to data processing system 140 and/or a user of data processing system 140.

During action set performance process 248, management controller 202 may cooperatively perform an end of life action set for data processing system 140 with the end of life management service (e.g., server 206). The end of life action set may include: (i) removing a portion of data from data processing system 140 (via, for example, providing the portion of the data to server 206 for storage), the portion of the data being desired for retention by a user of data processing system 140, (ii) performing one or more decommissioning processes for data processing system 140 (e.g., destroying stored data) to prevent undesired use of data processing system 140 following the end of life event, and/or (iii) other actions.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes.

Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, via processes and interactions shown in FIGS. 2A-2C, management controller 202 may facilitate activation of one or more entitlements (e.g., subscriptions) for data processing system 140. Management controller 202 may also be recognized as a trusted entity by server 206 and may proceed to interact with server 206 to manage operation of data processing system 140 using the out of band communication channel.

As discussed above, the components of FIGS. 1A-1C may perform various methods to manage data processing systems. FIG. 3 illustrates methods that may be performed by the components of FIGS. 1A-1C. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of onboarding a data processing system in accordance with an embodiment is shown. The method may be performed, for example, by a management controller of the data processing system, and/or any other entity.

At operation 300, an occurrence of an onboarding event for a data processing system may be identified. The occurrence of the onboarding event may be identified by: (i) performing a setup process for a new user of the data processing system (e.g., powering on and logging in using access credentials by the new user) and receiving an ownership voucher from an orchestrator (and/or other entity), (ii) obtaining a notification that the occurrence of the onboarding event has occurred for the management controller from another entity, and/or (iii) other methods.

At operation 302, an entitlement certificate from an ownership voucher transferred to the data processing system as part of an onboarding of the data processing system to a domain may be obtained. Obtaining the entitlement certificate may include: (i) receiving, via an out of band communication channel, an ownership voucher from an orchestrator (and/or other entity) and extracting the entitlement certificate from the ownership voucher, (ii) receiving, via a side band communication channel of the data processing system, the entitlement certificate from hardware resources of the data processing system, (iii) reading the entitlement certificate from storage, (iii) receiving the entitlement certificate from another entity throughout the domain, and/or (iv) other methods.

At operation 304, an action set may perform, via an out of band communication channel, to manage entitlements for the data processing system using the entitlement certificate.

In a first example, performing the action set may include: (i) generating a message including the entitlement certificate, (ii) providing the message to a server associated with the domain, and/or (iii) obtaining, in response to the providing, an indication of whether the server was able to verify the entitlement certificate using at least a public key of a public private key pair. If the server was able to verify the entitlement certificate, an action set may be cooperatively performed to enable the entitlements for the data processing system.

Generating the message may include: (i) obtaining a list of requested entitlements for the data processing system, (ii) encapsulating at least the list of the requested entitlements and the entitlement certificate in a data structure, (iii) labeling the data structure as the message, and/or (iv) other methods.

Providing the message to the server associated with the domain may include transmitting the message over an out of band communication channel to the server.

Obtaining the indication of whether the server was able to verify the entitlement certificate may include receiving, via the out of band communication channel and via the network endpoint associated with the management controller, a notification from the server in the form of a second message and reading the second message to identify the indication.

The action set to enable the entitlements for the data processing system may be cooperatively performed by: (i) identifying an occurrence of an event indicating that one or more of the entitlements is to be utilized, (ii) providing, via the out of band communication channel, information related to the one or more entitlements to the server, the information being usable by the server to facilitate the requested one or more entitlements, (iii) receiving, from the server and via the out of band communication channel, instructions to be performed as part of utilizing the one or more entitlements, and/or (iv) other methods. Refer to FIG. 2B for additional details and an example of cooperatively performing the action set to enable the entitlements for the data processing system.

In a second example, performing the action set may include: (i) identifying an occurrence of an end of life event for the data processing system, (ii) providing a message to an end of life service, the message including the entitlement certificate, and/or (iii) obtaining, in response to the providing, an indication of whether the end of life management service was able to verify the entitlement certificate using at least a public key of a public private key pair. If the end of life management service was able to verify the entitlement certificate, an end of life action set for the data processing system may be cooperatively performed with the end of life service.

The occurrence of the end of life event for the data processing system may include: (i) obtaining a notification from the end of life management service, the notification indicating that the end of life event has occurred, (ii) reading an indication from storage that the end of life event has occurred, and/or (iii) other methods.

Providing the message to the end of life service may include: (i) obtaining the message, (ii) transmitting, via an out of band communication channel, the message to the end of life management service, and/or (iii) other methods. Obtaining the message may include generating the message using at least the entitlement certificate.

Obtaining the indication of whether the end of life management service was able to verify the entitlement certificate may include receiving, via the out of band communication channel, a notification from the end of life management service in the form of a third message and reading the third message to identify the indication.

The end of life action set for the data processing system may be cooperatively performed by: (i) providing, via the out of band communication channel, information from the data processing system that is to be retained remotely to the end of life management service, (iii) receiving, from the end of life management service and via the out of band communication channel, instructions to be performed as part of the end of life event (e.g., decommissioning one or more hardware and/or software components, deleting data), and/or (iv) other methods. Refer to FIG. 2C for additional details and an example of cooperatively performing the end of life action set with the end of life management service.

The method may end following operation 304.

Managing onboarding of data processing systems may include monitoring entitlements over time to identify modifications to the list of the entitlements included in the entitlement certificate. Therefore, managing onboarding of the data processing system may also include: (i) identifying that at least a portion of the entitlement certificate has expired, (ii) obtaining, via the out of band communication channel, an updated entitlement certificate, (iii) performing a second action set to manage updated entitlements using the updated entitlement certificate, and/or (iv) other methods.

Identifying that at least the portion of the entitlement certificate has expired may include: (i) obtaining a notification from an entity (e.g., the server) indicating that one or more of the entitlements included in the entitlement certificate have expired, (ii) making a modification to one or more of the entitlements (e.g., via adding or removing a subscription), (iii) reading from storage that at least the portion of the entitlement certificate has expired, and/or (iv) other methods.

Obtaining the updated entitlement certificate may include: (i) receiving, via the out of band communication channel, the updated entitlement certificate from the server, (ii) reading the updated entitlement certificate from storage, (iii) receiving the updated entitlement certificate from another entity throughout the domain, and/or (iv) other methods.

The second action set may be performed by: (i) deleting previous copies of the entitlement certificate, (ii) storing the updated entitlement certificate in storage, (iii) interacting with the server to initiate one or more of the entitlements included in the updated entitlement certificate (e.g., via methods described in operation 304), and/or (iv) other methods.

Figure 4:
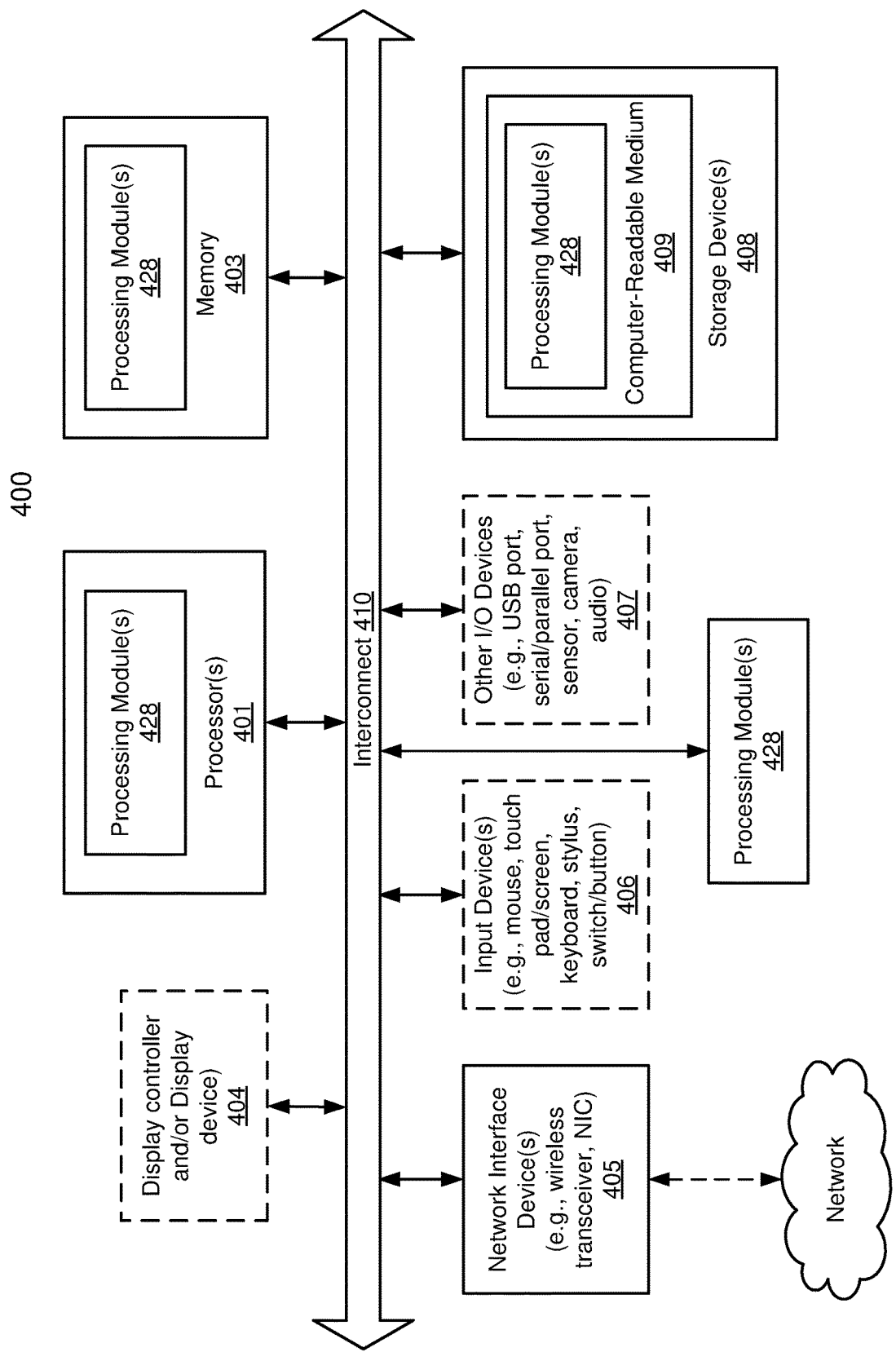
FIG. 4 shows a block diagram illustrating a data processing system in accordance with an embodiment.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing onboarding of a data processing system, the method comprising:
   identifying, by a management controller of the data processing system, an occurrence of an onboarding event for the data processing system;
   obtaining, by the management controller, an entitlement certificate from an ownership voucher transferred to the data processing system as part of an onboarding of the data processing system to a domain, the entitlement certificate being signed using a private key of a public private key pair kept secret by a manufacturer of the data processing system;
   performing, by the management controller and via an out of band communication channel, an action set to manage entitlements for the data processing system using the entitlement certificate;
   identifying, by the management controller, that at least a portion of the entitlement certificate has expired;
   obtaining, by the management controller and via the out of band communication channel, an updated entitlement certificate; and
   performing, by the management controller, a second action set to manage updated entitlements using the updated entitlement certificate.

2. The method of claim 1, wherein the ownership voucher comprises:
   the entitlement certificate; and
   at least one delegation of authority over the data processing system.

3. The method of claim 2, wherein the entitlement certificate comprises:
   a payload indicating a list of entitlements for the data processing system; and
   a signature generated using the private key of the public private key pair maintained by the manufacturer.

4. The method of claim 2, wherein the at least one delegation of authority over the data processing system comprises:
   an ownership certificate, the ownership certificate comprising:
      a payload comprising a public key for an owner of the data processing system; and
      a signature generated using the private key of the public private key pair maintained by the manufacturer.

5. The method of claim 2, wherein a public key of the public private key pair is distributed to one or more entities of the domain to permit the one or more entities to verify integrity and trust in contents of the ownership voucher.

6. The method of claim 1, wherein performing the action set to manage the entitlements for the data processing system comprises:
   generating, by the management controller, a message comprising the entitlement certificate;
   providing the message to a server associated with the domain;
   obtaining, in response to the providing, an indication of whether the server was able to verify the entitlement certificate using at least a public key of the public private key pair; and
   in an instance of the obtaining in which the server was able to verify the entitlement certificate:
      cooperatively performing an action set to enable the entitlements for the data processing system.

7. The method of claim 1, wherein performing the action set to manage the entitlements for the data processing system comprises:
   identifying an occurrence of an end of life event for the data processing system;
   providing a message to an end of life management service, the message comprising the entitlement certificate;
   obtaining, in response to the providing, an indication of whether the end of life management service was able to verify the entitlement certificate using at least a public key of the public private key pair; and
   in an instance of the obtaining in which the end of life management service was able to verify the entitlement certificate:
      cooperatively performing an end of life action set for the data processing system with the end of life management service.

8. The method of claim 1, wherein the data processing system comprises a network module adapted to separately advertise network endpoints for the management controller and hardware resources of the data processing system, the network endpoints being usable by entities throughout the domain to address communications to the hardware resources using an in band communication channel and the management controller using the out of band communication channel.

9. The method of claim 8, wherein the management controller and the network module are on separate power domains from the hardware resources so that the management controller and the network module are operable while the hardware resources are inoperable.

10. The method of claim 8, wherein the out of band communication channel runs through the network module, and an in band communication channel that services the hardware resources also runs through the network module.

11. The method of claim 8, wherein the network module hosts a transmission control protocol/internet protocol (TCP/IP) stack to facilitate network communications via the out of band communication channel.

12. A non-transitory machine-readable medium having instructions stored therein, which when executed by a processor, cause the processor to perform operations for managing onboarding of a data processing system, the operations comprising:
   identifying, by a management controller of the data processing system, an occurrence of an onboarding event for the data processing system;
   obtaining, by the management controller, an entitlement certificate from an ownership voucher transferred to the data processing system as part of an onboarding of the data processing system to a domain, the entitlement certificate being signed using a private key of a public private key pair kept secret by a manufacturer of the data processing system;
   performing, by the management controller and via an out of band communication channel, an action set to manage entitlements for the data processing system using the entitlement certificate;
   identifying, by the management controller, that at least a portion of the entitlement certificate has expired;
   obtaining, by the management controller and via the out of band communication channel, an updated entitlement certificate; and
   performing, by the management controller, a second action set to manage updated entitlements using the updated entitlement certificate.

13. The non-transitory machine-readable medium of claim 12, wherein the ownership voucher comprises:
   the entitlement certificate; and
   at least one delegation of authority over the data processing system.

14. The non-transitory machine-readable medium of claim 13, wherein the entitlement certificate comprises:
   a payload indicating a list of entitlements for the data processing system; and
   a signature generated using the private key of the public private key pair maintained by the manufacturer.

15. A data processing system, comprising:
   a processor; and
   a memory coupled to the processor to store instructions, which when executed by the processor, cause the processor to perform operations for managing onboarding of a data processing system, the operations comprising:
      identifying, by a management controller of the data processing system, an occurrence of an onboarding event for the data processing system;
      obtaining, by the management controller, an entitlement certificate from an ownership voucher transferred to the data processing system as part of an onboarding of the data processing system to a domain, the entitlement certificate being signed using a private key of a public private key pair kept secret by a manufacturer of the data processing system;
      performing, by the management controller and via an out of band communication channel, an action set to manage entitlements for the data processing system using the entitlement certificate;
      identifying, by the management controller, that at least a portion of the entitlement certificate has expired;
      obtaining, by the management controller and via the out of band communication channel, an updated entitlement certificate; and
      performing, by the management controller, a second action set to manage updated entitlements using the updated entitlement certificate.

16. The data processing system of claim 15, wherein the ownership voucher comprises:
   the entitlement certificate; and
   at least one delegation of authority over the data processing system.

17. The data processing system of claim 16, wherein the entitlement certificate comprises:
   a payload indicating a list of entitlements for the data processing system; and
   a signature generated using the private key of the public private key pair maintained by the manufacturer.

18. The non-transitory machine-readable medium of claim 13, wherein the at least one delegation of authority over the data processing system comprises:
   an ownership certificate, the ownership certificate comprising:
      a payload comprising a public key for an owner of the data processing system; and
      a signature generated using the private key of the public private key pair maintained by the manufacturer.

19. The non-transitory machine-readable medium of claim 13, wherein a public key of the public private key pair is distributed to one or more entities of the domain to permit the one or more entities to verify integrity and trust in contents of the ownership voucher.

20. The data processing system of claim 16, wherein a public key of the public private key pair is distributed to one or more entities of the domain to permit the one or more entities to verify integrity and trust in contents of the ownership voucher.

* * * * *